Patented Mar. 17, 1953

2,632,023

UNITED STATES PATENT OFFICE 2,632,023

METHOD OF PREPARING 2,5-DIAMINO-2,5-DIMETHYLHEXANE

Newman M. Bortnick, Philadelphia, Pa., assignor to Rohm & Haas Company, Philadelphia, Pa., a corporation of Delaware No Drawing. Application July 7, 1950, Serial No. 172,623

2 Claims. (Cl. 260—583)

This invention relates to a new process for the preparation of 2,5-diamino-2,5-dimethylhexane. The process of this invention is convenient and efficient and gives rise to a compound which is useful in the preparation of linear polymers and the derivatives of which, such as Schiff's bases, are unusually stable.

The process comprises reacting hydrogen cyanide and sulfuric acid, in the presence of water, with bimethallyl,

The hydrogen cyanide combines with the bimethallyl in the ratio of two moles of hydrogen cyanide to one mole of the latter. A lower ratio naturally results in a lowered yield of product, but, on the other hand, there does not appear to be any advantage in using the hydrogen cyanide in a ratio higher than that of three moles of hydrogen cyanide to one mole of the bimethallyl. The recommended ratio, therefore, is 2-2.5 moles of the former to one of the latter.

The role of the sulfuric acid is that of reactant—not catalyst—and two moles of acid react with one mole of the bimethallyl. In the presence of water, however, somewhat less than the ratio of two moles of acid can be employed since the water brings about some regeneration of the acid during the course of the process. In any case a minimum ratio of 1.5 moles of sulfuric acid per mole of bimethallyl is required. It is further recommended that the maximum ratio be 2.5 moles on the same basis, although up to 5 moles can be employed.

The reaction, which is carried out in an aqueous medium, can be considered to take place in two steps and of real importance is the amount of water which is present in each step. In the first step the amount of water which is present directly influences the concentration and hence the reactivity of the sulfuric acid with the hydrogen cyanide and bimethallyl. It is essential that the concentration of sulfuric acid at this point be from 16% to 90%—or preferably from 25% to 60%. It follows, therefore, that the amount of water employed must be from about one-tenth to approximately five times the weight of the sulfuric acid—or preferably from about two-thirds to three times the weight of acid.

It is necessary to employ proper controls in the preparation of the aqueous mixture because the reaction of bimethallyl, hydrogen cyanide and sulfuric acid is exothermic and occurs readily and can carry the temperature to dangerous limits. In order to regulate the rate of reaction it is important that the temperature be maintained between about 15° C. and 50° C. during the mixing of the reactants. Ordinarily the sulfuric acid is added slowly to the other components of the reaction mixture, but the order of mixing can be varied so long as the temperature is controlled and polymerization of the bimethallyl by its contact with sulfuric acid alone is avoided. When proper cooling means are provided, all of the reactants can be mixed and the heat of the resultant exothermic reaction can be dissipated in about an hour or less. In order to insure completion of the first step of the reaction, it is advisable that the mixture of reactants be heated for a short time after the exothermic reaction has subsided. Heating up to 80° C., or preferably between 40° C. and 70° C., is suggested. At this stage the reactants have combined to form a diformamide of the original bimethallyl which is easily separated, if desired, after neutralization of the solution and extraction thereof with a solvent such as chloroform or ethylene dichloride. This intermediate product which has the formula

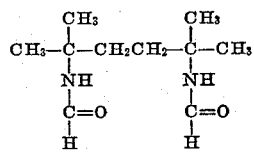

need not be isolated. Rather, in the second step in the preparation of the diamine this intermediate is hydrolyzed to the final product, 2,5-diamino-2,5-dimethylhexane. Some hydrolysis of the diformamide takes place during the heating step described above but what is required for substantially complete hydrolysis of the intermediate compound is that it be heated in the presence of a sufficient amount of water. For this purpose it has been found necessary to have water present in an amount from one to nine times the weight of sulfuric acid originally present. This means that water must be added at this stage if the amount employed originally is outside of these limits. For this step of hydrolysis temperatures above 80° C. and up to the refluxing temperature of the reaction mixture are recommended. This hydrolysis requires from about one-half to four hours for completion. One particularly good modification of the general process involves the use of water from the beginning in an amount equal to approximately twice the weight of sulfuric acid. That is, enough water is employed at the outset to give a concentration of sulfuric acid equal to 30% to 40%.

The same steps of mixing, heating the mixture to temperatures below about 80° C. to form the intermediate, then hydrolyzing above about 80° C. and finally isolating the free diamine are followed without further adjustment in the amount of water.

The reaction mixture is then neutralized with a strong base such as a hydroxide of sodium, potassium, or calcium, and the free diamine is isolated, for example by salting out, solvent extraction or distillation, and is thereafter purified preferably by fractional distillation.

The following example serves to illustrate in greater detail how 2,5-diamino-2,5-dimethylhexane is made.

*Example*

Into a three-necked flask equipped with reflux condenser, thermometer, dropping funnel, and stirrer were charged one mole of bimethallyl, 2.5 moles of hydrogen cyanide, and 2.5 moles of water. While the mixture was stirred, 2.5 moles of sulfuric acid was added slowly over a period of one-half hour. The exothermic reaction which occurred was controlled by the use of an ice-bath and the temperature was thereby held below 30° C. until all of the sulfuric acid had been added. Thereafter the reaction mixture was cautiously heated to 60° C. over a period of an hour, 13 moles of water was added and the mixture was held at 60° to 80° C. for two hours. The mixture was neutralized with sodium hydroxide and then distilled. A fraction boiling at 181° to 191° C. and representing a 42.4% yield was redistilled and the product 2,5-diamino-2,5-dimethylhexane thus obtained. It boiled at 184°–186° C. under atmospheric pressure and its composition was confirmed by analysis.

I claim:

1. A process for preparing 2,5-diamino-2,5-dimethylhexane which consists of first mixing at a temperature of 15°–50° C. one mole of bimethallyl, 2 to 3 moles of hydrogen cyanide, 1.5 to 5.0 moles of sulfuric acid and water in an amount equal to 0.1 to 5 times the weight of said sulfuric acid, heating the resultant aqueous mixture at 40°–80° C. to form 2,5-diformamido-2,5-dimethylhexane, then continuing heating from 80° C. to the refluxing temperature in the presence of water totalling one to nine times the weight of said sulfuric acid, neutralizing the resultant mixture with a strong base, and finally isolating said 2,5-diamino-2,5-dimethylhexane.

2. A process for preparing 2,5-diamino-2,5-dimethylhexane which consists of first mixing at a temperature of 15°–50° C. one mole of bimethallyl, 2 to 2.5 moles of hydrogen cyanide, 1.5 to 2.5 moles of sulfuric acid and water in an amount equal to two-thirds to three times the weight of said sulfuric acid, heating the resultant aqueous mixture at 40°–80° C. to form 2,5-diformamido-2,5-dimethylhexylhexane, then continuing heating from 80° C. to the refluxing temperature in the presence of water totalling one to nine times the weight of said sulfuric acid, neutralizing the resultant mixture with a strong base, and finally isolating said 2,5-diamino-2,5-dimethyhexane.

NEWMAN M. BORTNICK.

REFERENCES CITED

The following references are of record in the file of this patent:

UNITED STATES PATENTS

| Number | Name | Date |
|--------|------|------|
| 2,457,660 | Gresham et al. | Dec. 28, 1948 |

OTHER REFERENCES

Ritter et al.: J. A. C. S., vol. 70, pp. 4045–4048 (1948).

Ritter et al.: J. A. C. S., vol. 70, pp. 4048–4050 (1948).

Degering: "An Outline of Organic Nitrogen Compounds," University Lithoprinters, Ypsilanti, Michigan, 1945, pp. 409–410.